(12) United States Patent
Rhodes et al.

(10) Patent No.: US 12,515,547 B2
(45) Date of Patent: Jan. 6, 2026

(54) HEAT EXCHANGER FOR A CHARGING INLET ASSEMBLY

(71) Applicant: TE CONNECTIVITY SOLUTIONS GMBH, Schaffhausen (CH)

(72) Inventors: Clara Marguerite Rhodes, Winston Salem, NC (US); Kevin John Peterson, Kernersville, NC (US); Nathan Philip Myer, Lancaster, PA (US); Matthew Bryan Hitchcock, Hershey, PA (US); Aaron James de Chazal, Rochester, MI (US)

(73) Assignee: TE Connectivity Solutions GmbH (CH)

( * ) Notice: Subject to any disclaimer, the term of this patent is extended or adjusted under 35 U.S.C. 154(b) by 604 days.

(21) Appl. No.: 17/883,709

(22) Filed: Aug. 9, 2022

(65) Prior Publication Data

US 2023/0057953 A1 Feb. 23, 2023

Related U.S. Application Data

(60) Provisional application No. 63/234,670, filed on Aug. 18, 2021.

(51) Int. Cl.
*B60L 53/302* (2019.01)
*B60L 53/16* (2019.01)
(Continued)

(52) U.S. Cl.
CPC ............. *B60L 53/302* (2019.02); *B60L 53/16* (2019.02); *H01R 13/5202* (2013.01); *H02J 7/0042* (2013.01)

(58) Field of Classification Search
CPC ... B60L 53/302; B60L 53/16; H01R 13/5202; H02J 7/0042
(Continued)

(56) References Cited

U.S. PATENT DOCUMENTS 10,618,418 B2 * 4/2020 Turik ..................... B60L 53/16
10,756,498 B1 * 8/2020 Sarraf ................... B60L 53/302
(Continued)

OTHER PUBLICATIONS

International Search Report, International App. No. PCT/IB2022/057718 International Filing Date Aug. 17, 2022.

*Primary Examiner* — Suchin Parihar

(57) ABSTRACT

A DC charging module for a charging inlet assembly includes a module housing extending between a front and a rear. The module housing has an inner chamber between the front and the rear. The DC charging module includes a terminal having a mating pin at a front of the terminal and a cable connector at a rear of the terminal. The cable connector is located in the inner chamber of the module housing. The mating pin extends forward of the module housing into the charging inlet assembly for mating with a charging connector coupled to the charging inlet assembly. The DC charging module includes a power cable extending into the inner chamber of the module housing to electrically connect to the cable connector of the terminal. The DC charging module includes a heat exchanger received in the inner chamber of the module housing. The heat exchanger is thermally coupled to the cable connector of the terminal. The heat exchanger includes a coolant channel for coolant flow through the heat exchanger for actively cooling the terminal.

20 Claims, 7 Drawing Sheets

(51) Int. Cl.
*H01R 13/52* (2006.01)
*H02J 7/00* (2006.01)

(58) Field of Classification Search
USPC .......................................... 320/109
See application file for complete search history.

(56) References Cited

U.S. PATENT DOCUMENTS

| | | |
|---|---|---|
| 11,846,475 B2 * | 12/2023 | Hitchcock .............. F28F 9/0253 |
| 2016/0221458 A1 * | 8/2016 | Lopez ..................... B60L 53/16 |
| 2020/0376970 A1 * | 12/2020 | Berggren ................ B60L 3/003 |
| 2020/0384875 A1 | 12/2020 | Rhodes et al. |
| 2021/0063097 A1 * | 3/2021 | Hitchcock ............... B60L 53/16 |
| 2022/0118866 A1 * | 4/2022 | Han ...................... B60L 53/302 |

* cited by examiner

HEAT EXCHANGER FOR A CHARGING INLET ASSEMBLY

CROSS REFERENCE TO RELATED APPLICATIONS

This application claims priority to U.S. Provisional Application No. 63/234,670, filed 18 Aug. 2021, the subject matter of which is herein incorporated by reference in its entirety.

BACKGROUND OF THE INVENTION

The subject matter herein relates generally to charging inlet assemblies.

Electrical connectors, such as power connectors, generate heat when current flows through the terminals and cables of the power connectors. For example, a power connector of a charging inlet assembly for a battery system of an electric vehicle (EV) or hybrid electric vehicle (HEV) may generate heat through the terminals and the cables of the charging inlet assembly during a charging process. A charging connector is configured to be mated with the terminals of the charging inlet assembly to charge the battery system of the vehicle. It is desirable to increase the current transmitted through the terminals for charging the battery. However, at higher currents, the terminals and the power cables experience an increase in temperature, which may damage the components of the charging inlet assembly.

A need remains for a cooling system for cooling a power connector, such as for a charging inlet assembly.

BRIEF DESCRIPTION OF THE INVENTION

In one embodiment, a DC charging module for a charging inlet assembly is provided. The DC charging module includes a module housing extending between a front and a rear. The module housing has an inner chamber between the front and the rear. The DC charging module includes a terminal includes a mating pin at a front of the terminal and a cable connector at a rear of the terminal. The cable connector is located in the inner chamber of the module housing. The mating pin extends forward of the module housing into the charging inlet assembly for mating with a charging connector coupled to the charging inlet assembly. The DC charging module includes a power cable extending into the inner chamber of the module housing to electrically connect to the cable connector of the terminal. The DC charging module includes a heat exchanger received in the inner chamber of the module housing. The heat exchanger is thermally coupled to the cable connector of the terminal. The heat exchanger includes a coolant channel for coolant flow through the heat exchanger for actively cooling the terminal.

In another embodiment, a charging inlet assembly for an electric vehicle is provided and includes a housing extending between a front and a rear. The housing has a DC section including DC terminal channels. The housing has an AC section including AC terminal channels. The DC section configured for mating with a DC charging connector at the front. The AC section configured for mating with an AC charging connector at the front. The DC charging module includes. The charging inlet assembly includes AC terminals received in the corresponding AC terminal channels for mating with the AC charging connector. The charging inlet assembly includes DC terminals received in the corresponding DC terminal channels for mating with the DC charging connector, each DC terminal includes a mating pin at a front of the DC terminal and a cable connector at a rear of the DC terminal. The cable connector is connected to an end of a power cable. The mating pin positioned in the corresponding DC terminal channel for mating with the charging connector. The charging inlet assembly includes a DC module coupled to the rear of the housing. The DC module includes a module housing and a heat exchanger received in the module housing. The module housing extends between a front and a rear. The module housing has an inner chamber. The inner chamber receives the cable connector of each DC terminal and the end of the corresponding power cable. The inner chamber receives the heat exchanger. The heat exchanger is thermally coupled to the cable connector of each DC terminal. The heat exchanger includes a coolant channel for coolant flow through the heat exchanger for actively cooling the DC terminals.

In a further embodiment, a charging inlet assembly for an electric vehicle is provided and includes a housing extending between a front and a rear. The housing has a DC section includes DC terminal channels. The housing has an AC section includes AC terminal channels. The DC section configured for mating with a DC charging connector at the front. The AC section configured for mating with an AC charging connector at the front. The charging inlet assembly includes AC terminals received in the corresponding AC terminal channels for mating with the AC charging connector. The charging inlet assembly includes a first DC terminal including a first mating pin at a front of the first DC terminal and a first cable connector at a rear of the first DC terminal. The first cable connector is connected to an end of a first power cable. The first mating pin positioned in the corresponding DC terminal channel for mating with the charging connector. The charging inlet assembly includes a second DC terminal including a second mating pin at a front of the second DC terminal and a second cable connector at a rear of the second DC terminal. The second cable connector is connected to an end of a second power cable. The second mating pin positioned in the corresponding DC terminal channel for mating with the charging connector. The charging inlet assembly includes a DC module coupled to the rear of the housing. The DC module includes a module housing and a heat exchanger received in the module housing. The module housing extends between a front and a rear. The module housing has an inner chamber. The inner chamber receiving the first and second cable connectors and the ends of the first and second power cable. The inner chamber receiving the heat exchanger. The heat exchanger includes a first thermal interface thermally coupled to the first cable connector and a second thermal interface thermally coupled to the second cable connector. The heat exchanger includes a coolant channel for coolant flow through the heat exchanger for actively cooling the DC terminals. The heat exchanger includes a first thermally conductive separator at the first thermal interface electrically isolating the heat exchanger from the first cable connector. The heat exchanger includes a second thermally conductive separator at the second thermal interface electrically isolating the heat exchanger from the second cable connector.

DETAILED DESCRIPTION OF THE INVENTION

Figure 1:
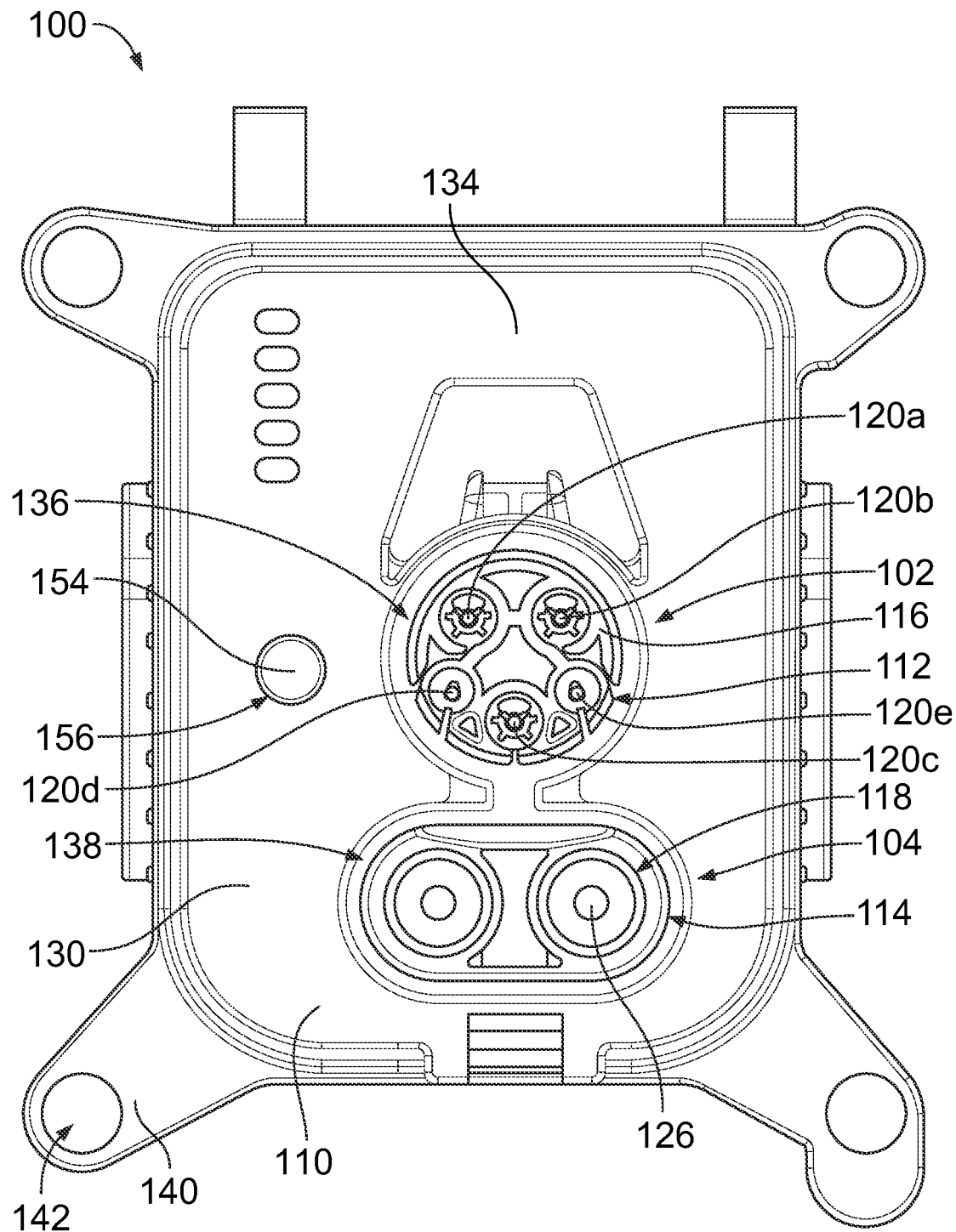
FIG. 1 is a front view of a charging inlet assembly including an AC charging module, a DC charging module, and a cooling system in accordance with an exemplary embodiment.
Figure 2:
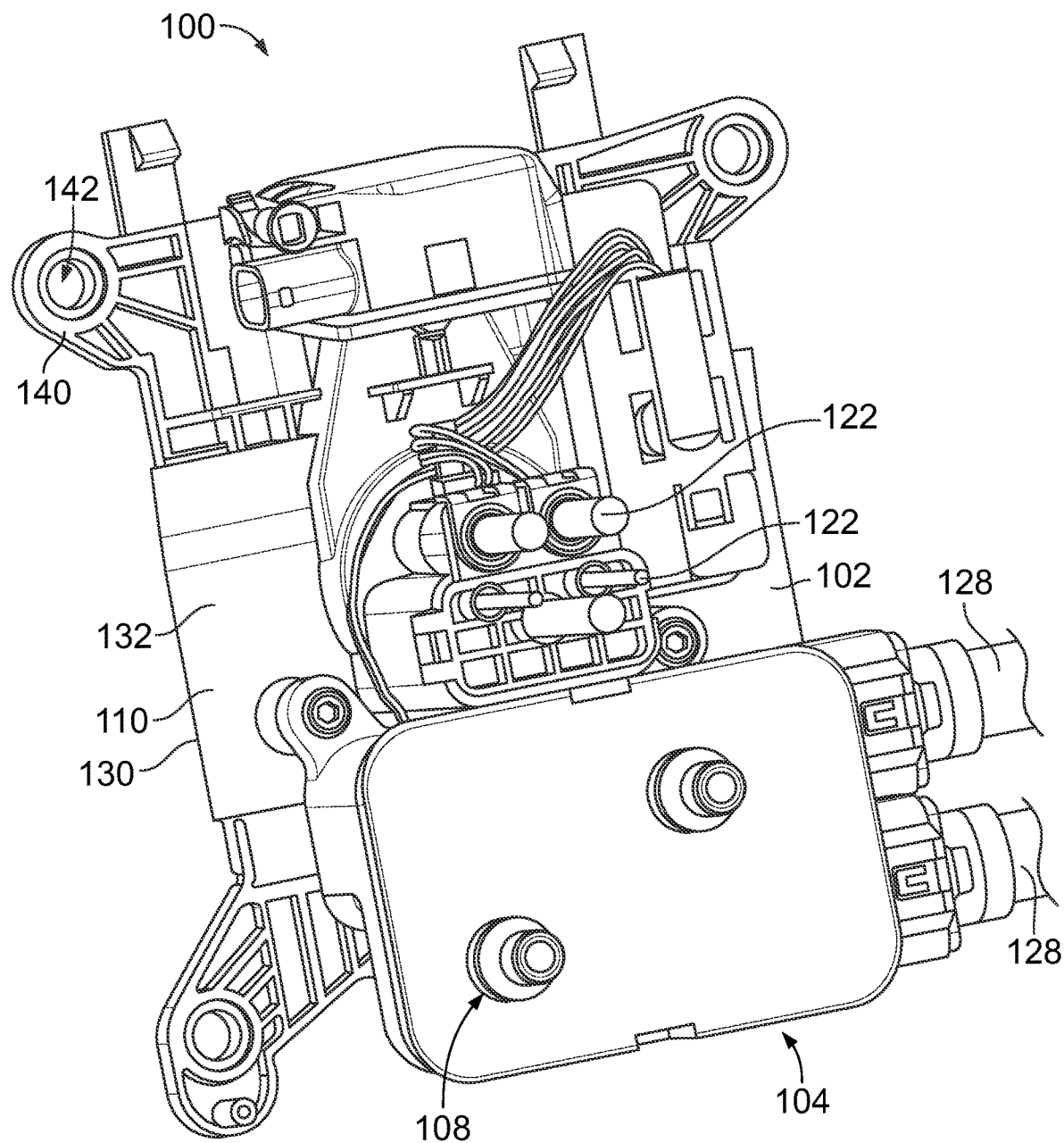
FIG. 2 is a rear perspective view of the charging inlet assembly showing the AC charging module, the DC charging module, and the cooling system in accordance with an exemplary embodiment.
Figure 3:
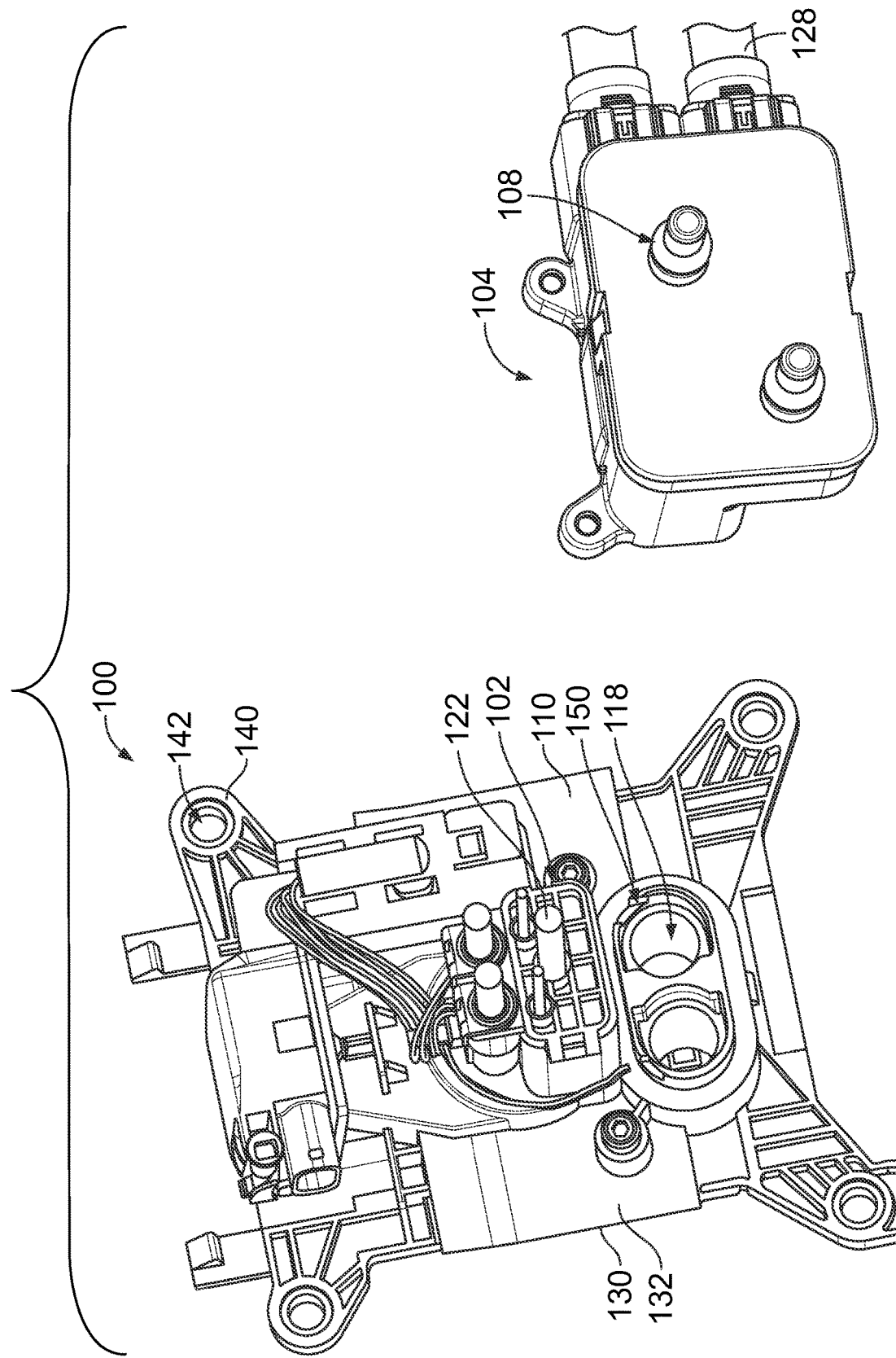
FIG. 3 is a rear perspective, exploded view of the charging inlet assembly showing the DC charging module poised for coupling to the housing of the charging inlet assembly in accordance with an exemplary embodiment.

FIG. 1 is a front view of a charging inlet assembly 100 including an AC charging module 102, a DC charging module 104, and a cooling system 108 in accordance with an exemplary embodiment. FIG. 2 is a rear perspective view of the charging inlet assembly 100 showing the AC charging module 102, the DC charging module 104, and the cooling system 108 in accordance with an exemplary embodiment. FIG. 3 is a rear perspective, exploded view of the charging inlet assembly 100 showing the DC charging module 104 poised for coupling to the housing of the charging inlet assembly 100. The cooling system 108 is used for cooling components of the charging inlet assembly 100, such as terminals and/or power cables of the charging inlet assembly 100.

The charging inlet assembly 100 is used as a charging inlet for a vehicle, such as an electric vehicle (EV) or hybrid electric vehicle (HEV). The charging inlet assembly 100 is configured for mating reception with a charging connector (not shown). In an exemplary embodiment, the charging inlet assembly 100 is configured for mating with various types of charging connectors, such as a DC fast charging connector (for example, the SAE combo CCS charging connector) in addition to AC charging connectors (for example, the SAE J1772 charging connector).

The charging inlet assembly 100 includes a housing 110 configured to be mounted in the vehicle. The housing 110 holds the AC charging module 102 and the DC charging module 104 for mating with the charging connector. In various embodiments, the AC charging module 102 and/or the DC charging module 104 are removable from the housing 110. For example, the charging modules 102 may be coupled to the housing 110 using latches, fasteners, clips, or other securing means. The charging modules 102, 104 may be removable from the housing 110 to separate components of the charging modules 102, 104 (for example, charging pins, cables, circuit boards, and the like) from the housing 110, such as for repair and/or replacement of the charging module components or other components of the charging inlet assembly 100.

In an exemplary embodiment, the housing 110 includes an AC section 112 that receives the AC charging module 102 and a DC section 114 that receives the DC charging module 104. The AC section 112 is configured for mating with an AC charging connector or an AC section of the charging connector. The DC section 114 is configured for mating with a DC charging connector or a DC section of the charging connector. The AC section 112 includes AC terminal channels 116. The DC section 114 includes DC terminal channels 118.

The charging inlet assembly 100 includes AC terminals 120 at the AC section 112. The AC terminals 120 are held by the housing 110. The AC terminals 120 are received in corresponding AC terminal channels 116. In various embodiments, the AC terminals 120 may be part of the AC charging module 102 that is coupled to the housing 110. In the illustrated embodiment, five AC terminals 120 are provided, including a first AC charging terminal 120a, a second AC charging terminal 120b, a ground terminal 120c, a proximity terminal 120d, and a pilot terminal 120e. Optionally, the AC terminals 120 may be different sized terminals. In an exemplary embodiment, the AC terminals 120 includes pins at mating ends of the AC terminals 120. AC power cables 122 are terminated to the AC terminals 120 and extend from the charging inlet assembly 100 to another component of the vehicle, such as the battery system of the vehicle. The AC terminals 120 are configured to be mated to the charging connector.

In an exemplary embodiment, the AC section 112 of the charging inlet assembly 100 defines a low-voltage connector configured to be coupled to the low-voltage portion of the charging connectors. The low-voltage connector (for example, the AC terminals 120 and the AC power cables 122) is configured to be coupled to other components in the system, such as a battery distribution unit, to control charging of the vehicle. The low-voltage connector may transmit/receive signals relating to charging, such as status of connection, status of charge, voltage of charge, and the like. The low-voltage connector may be socket connector configured to receive the charging plug. Seals may be provided at the interface of the low-voltage connector.

The charging inlet assembly 100 includes DC terminals 126 at the DC section 114. The DC terminals 126 are held by the housing 110. The DC terminals 126 are received in corresponding DC terminal channels 118. In various embodiments, the DC terminals 126 may be part of the DC charging module 104 that is coupled to the housing 110. In the illustrated embodiment, two DC terminals 126 are provided. In an exemplary embodiment, the DC terminals 126 includes pins at mating ends of the DC terminals 126. DC power cables 128 are terminated to the DC terminals 126 and extend from the charging inlet assembly 100 to another component of the vehicle, such as the battery system of the vehicle. The DC terminals 126 are configured to be mated to the charging connector.

In an exemplary embodiment, the DC section 114 of the charging inlet assembly 100 defines a high-voltage connector configured to be coupled to the high-voltage portion of the charging connector. The high-voltage connector (for example, the DC terminals 126 and the DC power cables 128) is configured to be coupled to other components in the system, such as the battery and/or the battery distribution unit of the vehicle. The high-voltage connector is used for fast charging of the battery. The high-voltage connector may be socket connector configured to receive the charging plug. Seals may be provided at the interface of the high-voltage connector.

In an exemplary embodiment, the cooling system 108 is used for cooling the DC terminals 126 and/or the DC power cables 128. Components of the cooling system 108 may be integrated with the DC charging module 104. For example, components of the cooling system 108 may be mated to and unmated from the housing 110 with the DC charging module 104. In an exemplary embodiment, the cooling system 108 is used to actively cool the DC terminals 126 and/or the DC power cables 128. For example, coolant may be pumped through lines or channels of the cooling system 108 and flow in thermal communication with the DC terminals 126 and/or the DC power cables 128. The coolant dissipate heat from the DC terminals 126 and the DC power cables 128, such as to increase the current to reduce charging time.

The housing 110 includes a front 130 and a rear 132. The front 130 of the housing 110 faces outward and is presented to the operator to connect the charging connector. The rear 132 faces the interior of the vehicle and is generally inaccessible without removing the housing 110 from the vehicle. In an exemplary embodiment, the housing 110 includes a panel 134 at the front 130. In an exemplary embodiment, an AC socket 136 is formed in the panel 134 at the AC section 112 and a DC socket 138 is formed in the panel 134 at the DC section 114. The AC socket 136 incudes a space around the AC terminals 120 that receives the charging connector. During charging, the AC charging connector is plugged into the AC socket 136 to electrically connect to the AC terminals 120. The DC socket 138 includes a space around the DC terminals 126 that receive the charging connector. The DC charging connector is configured to be plugged into the DC socket 138. During charging, the DC charging connector is plugged into the DC socket 138 to electrically connect to the DC terminals 128. The panel 134 may surround the AC socket 136 and the DC socket 138 at the front 130.

In an exemplary embodiment, the housing 110 includes mounting tabs 140 used for mounting the housing 110 to the vehicle. The mounting tabs 140 having openings 142 that receive fasteners (not shown) to secure the charging inlet assembly 100 to the vehicle. Other types of mounting features may be used to secure the charging inlet assembly 100 to the vehicle. In various embodiments, the charging inlet assembly 100 may include a mounting flange (not shown) coupled to the front of the housing 110 for mounting the charging inlet assembly 100 to the vehicle. The housing 110 and/or the mounting flange may include a seal (not shown) to seal the charging inlet assembly 100 to the vehicle. In various embodiments, the charging inlet assembly 100 may include a terminal cover (not shown) at the front of the housing 110 to cover portions of the housing 110, such as the DC section 114 and/or the AC section 112. The housing 110 may include one or more rear covers at the rear of the housing 110 to close access to the rear of the housing 110. The cover(s) may be clipped or latched onto the main part of the housing 110, such as using clips or latches. Other types of securing features, such as fasteners may be used in alternative embodiments.

In an exemplary embodiment, the housing 110 includes a rear cavity 150 at the rear 132. In the illustrated embodiment, the rear cavity 150 is provided at the DC section 114 to receive the DC charging module 104. In an exemplary embodiment, a portion of the cooling system 108 is received in the rear cavity 150. In the illustrated embodiment, the rear cavity 150 is open at the rear to receive the DC charging module 104 through the opening at the rear. In an exemplary embodiment, the housing 110 includes a housing securing element (not shown) used to secure the DC charging module 104 in the rear cavity 150, such as a latching element, threaded fasteners, clips or other securing elements.

Figure 4:
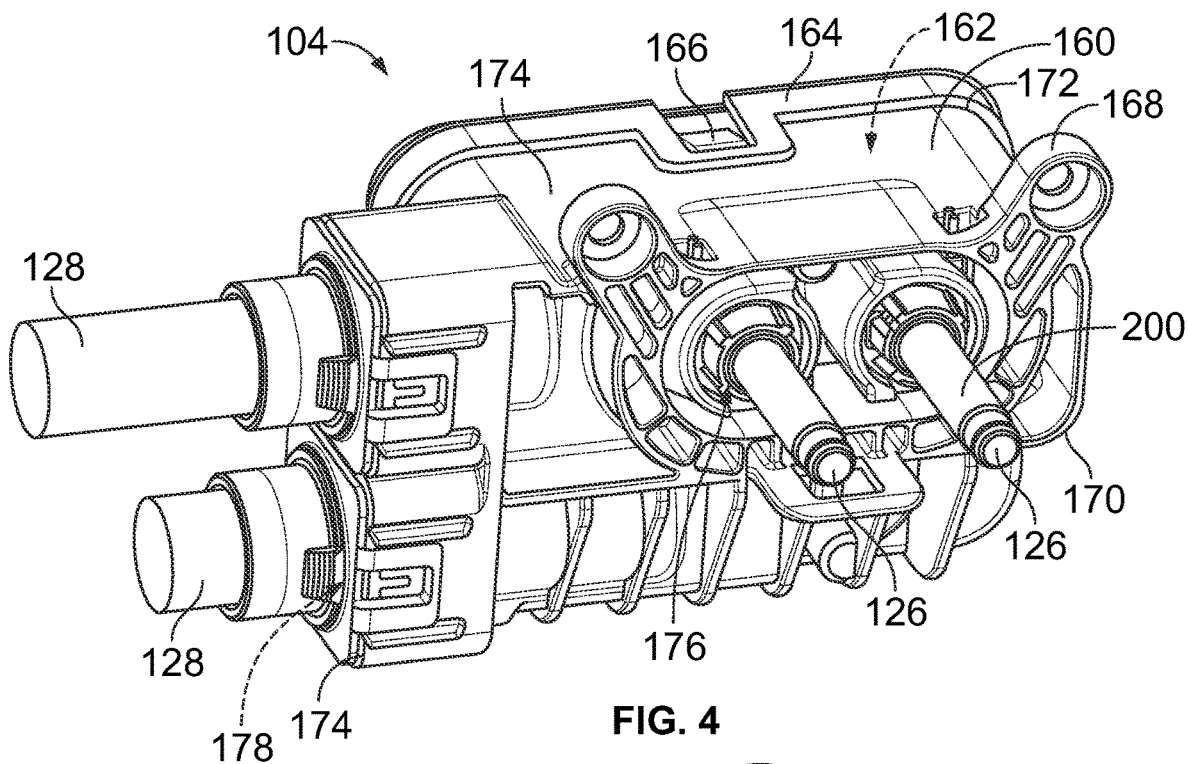
FIG. 4 is a front perspective view of the DC charging module in accordance with an exemplary embodiment.
Figure 5:
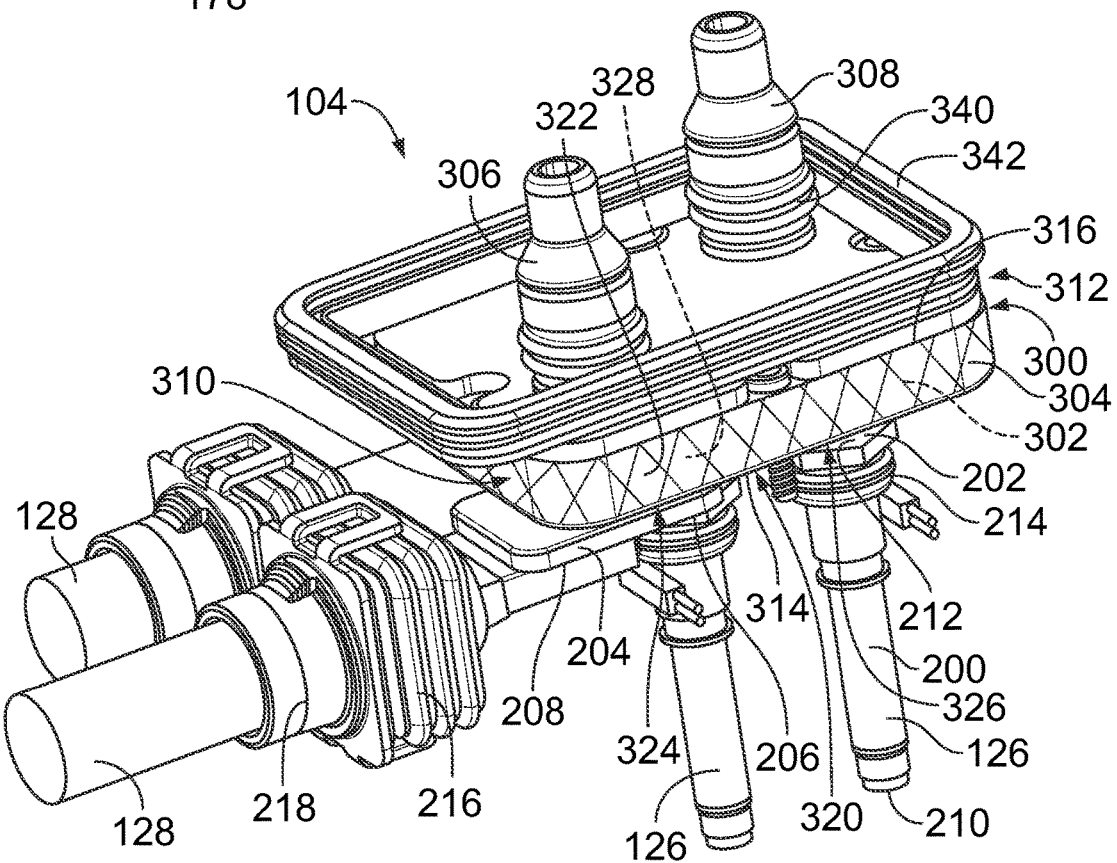
FIG. 5 is a rear perspective view of the DC charging module with a module housing of the DC charging module removed to illustrate internal components of the DC charging module in accordance with an exemplary embodiment.

FIG. 4 is a front perspective view of the DC charging module 104 in accordance with an exemplary embodiment. FIG. 5 is a rear perspective view of the DC charging module 104 with a module housing of the DC charging module 104 removed to illustrate internal components of the DC charging module 104.

The DC charging module 104 includes the DC terminals 126 and the DC power cables 128. The DC charging module 104 includes a module housing 160 (FIG. 4) having an inner chamber 162 and a rear cover 164 closing the module housing 160. The DC terminals 126 and the DC power cables 128 are received in the inner chamber 162. The module housing 160 includes a latching feature 166 for securing the rear cover 164 to the module housing 160. Other types of securing elements may be used in alternative embodiments to secure the rear cover 164 to the module housing 160, such as fasteners, clips, and the like. The module housing 160 includes mounting tabs 168 used for mounting the module housing 160 to the charging inlet assembly 100, such as to the housing 110 (FIG. 3) of the charging inlet assembly 100. The mounting tabs 168 receive fasteners (not shown) to secure the module housing 160 to the housing 110. The fasteners are removable to allow unmating of the DC charging module 104 from the housing 110, such as to repair or replace components. Other types of mounting features may be used in alternative embodiments, such as laches, clips, and the like. The module housing 160 includes a separable mating interface at the front of the module housing 160 configured to be removably coupled to the charging inlet assembly 100. Optionally, the module housing 160 may be directly coupled to the charging inlet assembly 100. Alternatively, the module housing 160 may be indirectly coupled to the charging inlet assembly 100, such as being coupled to another structure, such as the vehicle or a mounting bracket connected to the vehicle.

The module housing 160 extends between a front 170 and a rear 172. The module housing 160 includes side walls 174 between the front 170 and the rear 172. In various embodiments, the module housing 160 includes four side walls 174 forming a generally box-shaped housing structure. In an exemplary embodiment, the front 170 and the rear 172 have a larger surface area (for example, width and length) compared to the side walls 174. The module housing 160 may have other shapes in alternative embodiments.

In an exemplary embodiment, the module housing 160 includes terminal openings 176. The DC terminals 126 extend through the terminal openings 176. In the illustrated embodiment, the terminal openings 176 are provided at the front 170. The DC terminals 126 extend forward from the front 170 of the module housing 160.

In an exemplary embodiment, the module housing 160 includes cable openings 178. The DC power cables 128 extend through the cable openings 178. In the illustrated embodiment, the cable openings 178 are provided at the side wall 174. Optionally, both cable openings 178 may be provided at the same side wall 174. However, the cable openings 178 may be provided at different side walls 174. The DC power cables 128 extend from the side wall 174.

The DC terminal 126 includes a mating pin 200 at a front 210 of the DC terminal 126 and a cable connector 202 at a rear 212 of the DC terminal 126. The cable connector 202 may be separate and discrete from the mating pin 200. In other embodiments, the cable connector 202 may be integral with the mating pin 200 as a unitary, monolithic structure. In an exemplary embodiment, the mating pin 200 and/or the cable connector 202 are configured to be cooled by the cooling system 108 (FIG. 5).

The mating pin 200 is electrically conductive. In an exemplary embodiment, the mating pin 200 is cylindrical. In an exemplary embodiment, a seal 214 is coupled to the mating pin 200 for interface sealing against an interior surface of the housing 110 (shown in FIG. 1). The mating pin 200 is configured to be mated to the charging connector.

The cable connector 202 is configured to be electrically connected to the DC power cable 128. In an exemplary embodiment, the DC power cable 128 extends generally perpendicular to the DC terminal 126. However, other orientations are possible in alternative embodiments, such as parallel to the DC terminal 126. In an exemplary embodiment, a weld tab 204 is provided between the cable connector 202 and the DC power cable 128. The weld tab 204 is configured to be welded to the cable connector 202. The weld tab 204 is configured to be welded to the end of the conductor of the DC power cable 128. For example, weld pads 206, 208 may be provided at opposite ends of the weld tab for connection to the cable connector 202 and the DC power cable 128. In various embodiments, the weld pads 206, 208 may be ultrasonically welded to the cable connector 202 and the DC power cable 128, creating a low resistance interface between the DC terminal 126 and the DC power cable 128. In alternative embodiments, the end of the DC power cable 128 may be terminated directly to the cable connector 202 rather than having the weld tab 204 therebetween. In other alternative embodiments, the terminating end of the DC terminal 126 may be crimped to the end of the DC power cable 128.

In an exemplary embodiment, each DC power cable 128 includes a cable seal 216 configured to be sealed against the outer jacket of the DC power cable 128. The cable seal 216 is configured to be sealed against the module housing 160. The cable seal 216 is received cable openings 178 to seal against the module housing 160. The cable seal 216 is sealed to the module housing 160 to prevent moisture and debris from entering the inner chamber 162. In an exemplary embodiment, each DC power cable 128 includes a cable ferrule 218 used to connect the DC power cable 128 to the module housing 160. For example, the cable ferrule 218 may be secured using latches, clips, fasteners, and the like. The cable ferrule 218 may be used to secure the cable seal 216 in the cable opening 178. The cable ferrule 218 may be sealed to the cable seal 216.

In an exemplary embodiment, components of the cooling system 108 are received in the inner chamber 162. The cooling system 108 interfaces with the DC terminal 126 and/or the DC power cable 128 in the inner chamber 162 to provide active cooling for the DC terminal 126 and/or the DC power cable 128. In an exemplary embodiment, the cooling system 108 includes a heat exchanger 300 positioned in the chamber 162 to thermally couple to the DC terminal 126 to reduce the operating temperature of the DC terminal 126. The heat exchanger 300 includes a coolant channel 302 that allows coolant flow through the heat exchanger 300 to dissipate heat from the DC terminal 126. In various embodiments, the heat exchanger 300 may interface with the DC terminal 126 and/or the DC power cable 128 and/or the weld tab 204 to dissipate heat therefrom. The cooling system 108 lowers the operating temperature of the DC terminal 126 to improve performance of the charging inlet assembly 100 and/or to allow higher current through the DC terminal 126 and/or to reduce risk of damage to the DC terminal 126. In various embodiments, the heat exchanger 300 may be indirectly thermally coupled to the DC terminal 126, such as through a thermal interface material, a thermal grease or another thermal bridge.

The heat exchanger 300 includes a heat exchanger body 304 defining the coolant channel 302. The heat exchanger 300 includes a supply fitting 306 at a supply port of the heat exchanger body 304 and a return fitting 308 at a return port of the heat exchanger body 304. The fittings 306, 308 extend from the heat exchanger body 304 and are configured to be connected to a coolant supply line and a coolant return line, respectively.

The heat exchanger body 304 extends between a supply side 310 and a return side 312. The heat exchanger body 304 includes a front 314 and a rear 316. The heat exchanger body 304 includes an end wall 318 at the front 314. In an exemplary embodiment, the heat exchanger 300 includes a heat exchanger lid 320 coupled to the rear 316 of the heat exchanger body 304. The heat exchanger body 304 and the heat exchanger lid 320 may be manufactured from thermally conductive materials, such as metal materials. Optionally, both the heat exchanger body 304 and the heat exchanger lid 320 are manufactured form the same material. In various embodiments, the heat exchanger body 304 and/or the heat exchanger lid 320 are manufactured from aluminum or an aluminum alloy. The heat exchanger body 304 includes a side wall 322 extending between the front 314 and the rear 316. The side wall 322 extends between the end wall 318 and the heat exchanger lid 320.

In an exemplary embodiment, the end wall 318 includes a first thermal interface 324 configured to be thermally coupled to one of the DC terminals 126 (for example, thermally coupled to the weld tab 204) and a second thermal interface 326 configured to be thermally coupled to the other DC terminal 126 (for example, thermally coupled to the weld tab 204). The end wall 318 of the heat exchanger body 304 may interface with the weld tabs 204 through a thermally conductive separator 328. The thermally conductive separator 328 electrically isolates the heat exchanger 300 from the DC terminal 126. In an exemplary embodiment, the thermally conductive separator 328 is an electrical isolating coating applied to the outer surface of the heat exchanger body 304. Optionally, the entire outer surface may be covered with the electrical isolating coating. In other various embodiments, selective portions of the outer surface are covered by the electrical isolating coating, such as at the thermal interfaces 324, 326. The electrical isolating coating may be a thin layer on the outer surface. In an exemplary embodiment, the electrical isolating coating is manufactured from an electrically insulative material. In an exemplary embodiment, the electrical isolating coating is manufactured from a thermally conductive material. In various embodiments, the electrical isolating coating is an electrostatic power coating layer. In other various embodiments, the electrical isolating coating is a tape or film applied to the outer surface.

The heat exchanger body 304 defines a space or cavity forming the coolant channel 302. For example, the side wall 322 and the end wall 318 form the cavity. The heat exchanger lid 320 is coupled to the heat exchanger body 304 to close the heat exchanger body 304. In an exemplary embodiment, the heat exchanger lid 320 may be separate and discrete from the heat exchanger body 304. In an exemplary embodiment, the heat exchanger lid 320 is coupled to the heat exchanger body 304 using fasteners and may be sealed to the to the heat exchanger body 304 to prevent leakage of the coolant from the coolant channel 302. In various embodiments, the to the heat exchanger lid 320 may be brazed to the heat exchanger body 304. The supply fitting 306 and the return fitting 308 extend from the heat exchanger lid 320.

The coolant channel 302 is configured for flow communication with the supply fitting 306 and the return fitting 308, and thus the supply and return coolant lines. The coolant is routed through the coolant channel 302 to dissipate heat from the heat exchanger body 304 of the heat exchanger 300 for cooling the DC terminals 126. The coolant channel 302 may extend along a non-linear path, such as a curved or serpentine path in alternative embodiments. The coolant channel 302 extends between an inlet at the supply side 310 and an outlet at the return side 312. The supply fitting 306 is coupled to the inlet and the return fitting 308 is coupled to the outlet. The coolant flow direction through the coolant channel may be parallel to the weld tabs 204.

In an exemplary embodiment, the fittings 306, 308 include fitting seals 340. The fitting seals 340 are configured to be sealed to the module housing 160. For example, the fittings 306, 308 may pass through the rear cover 164. The fitting seals 340 may be sealed to the rear cover 164 to prevent moisture and debris from entering the inner chamber 162.

In an exemplary embodiment, the heat exchanger 300 includes a perimeter seal 342. The perimeter seal 342 is configured to be sealed to the module housing 160. For example, the perimeter seal 342 may seal against the interior surface of the module housing 160 and/or the rear cover 164. The perimeter seal 342 prevents moisture and debris from entering the inner chamber 162.

Figure 6:
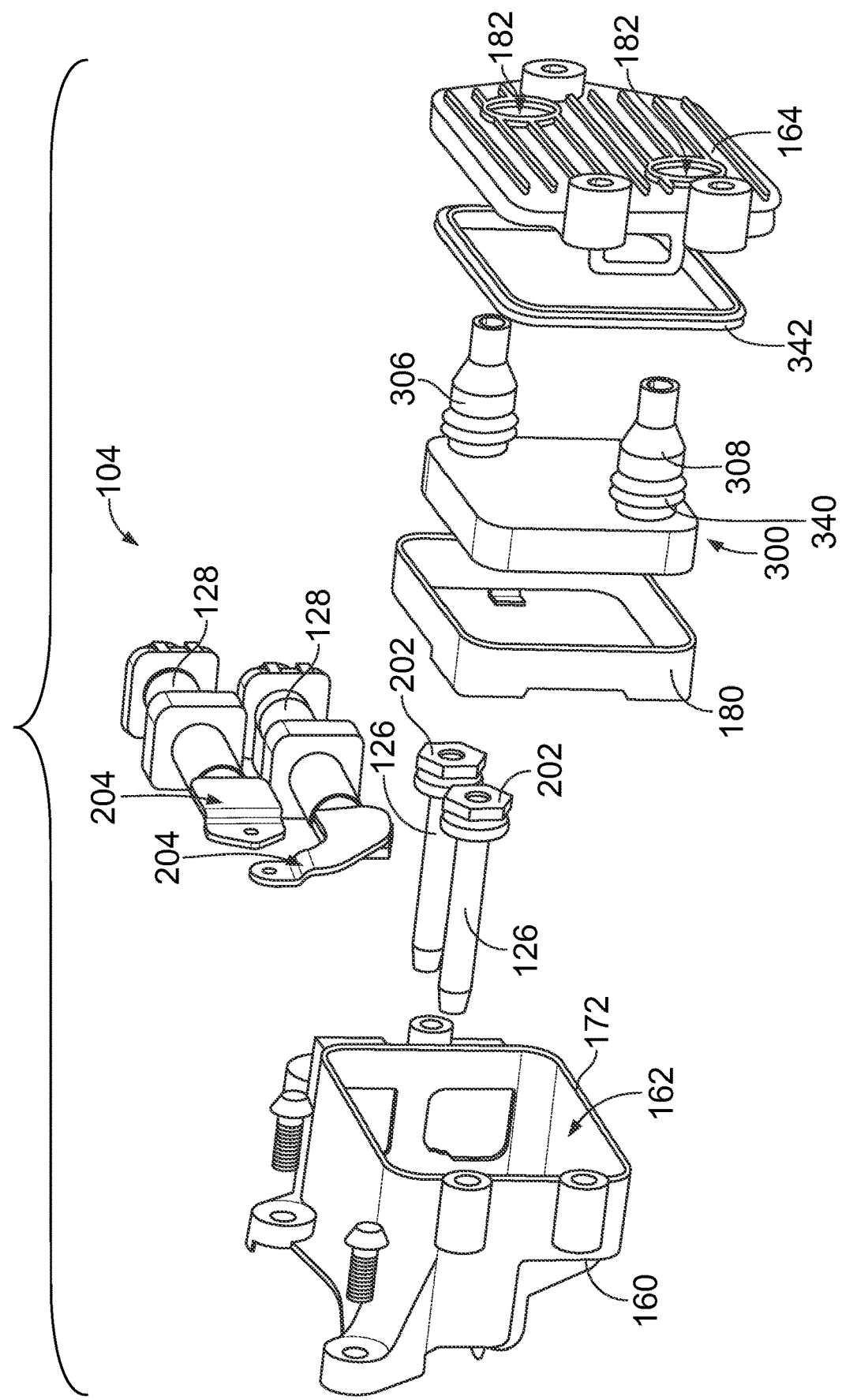
FIG. 6 is an exploded view of the DC charging module with a module housing of the DC charging module removed to illustrate internal components of the DC charging module in accordance with an exemplary embodiment.

FIG. 6 is an exploded view of the DC charging module 104 with a module housing of the DC charging module 104 removed to illustrate internal components of the DC charging module 104. During assembly, the DC terminals 126 and the DC power cables 128 are loaded into the inner chamber 162. The DC power cables 128 may be coupled to cable connectors 202 of the DC terminals 126 in the inner chamber 162, such as using the weld tabs 204. Alternatively, the DC power cables 128 may be coupled to cable connectors 202 of the DC terminals 126 prior to loading the DC power cables 128 and the DC terminals 126 in the inner chamber 162.

The heat exchanger 300 is configured to be loaded into the inner chamber 162 after the DC power cables 128 and the DC terminals 126 are loaded in the inner chamber 162. The heat exchanger 300 is position in thermal contact with the terminal/cable assembly, such as to the weld tab 204. In an exemplary embodiment, a support frame 180 is used to support the heat exchanger 300. The heat exchanger 300 is loaded into the support frame 180 and then the support frame, with the heat exchanger 300, is loaded into the inner chamber 162, such as through the rear 172. The support frame 180 has a complementary shape as the walls defining the inner chamber 162 to securely position the heat exchanger 300 in the inner chamber 162. In an exemplary embodiment, the perimeter seal 342 is coupled to the support frame 180. The support frame 180 may position the perimeter seal 342 in the inner chamber 162.

The rear cover 164 is coupled to the module housing 160 after the heat exchanger 300 is received in the inner chamber 162. The rear cover 164 includes openings 182 that receive the fittings 306, 308. The fitting seals 340 are sealed to the rear cover 164 in the openings 182. The rear cover 164 is configured to sealingly engage the perimeter seal 342. Optionally, fasteners (not shown) are used to secure the rear cover 164 to the rear 172 of the module housing 160 to close out the inner chamber 162.

In an alternative embodiment, the heat exchanger 300, the support frame 180, and the perimeter seal 342 may be loaded into the rear cover 164 prior to coupling the rear cover 164 to the module housing 160. The heat exchanger 300, the support frame 180, and the perimeter seal 342 may be loaded into the inner chamber 162 by the rear cover 164 as the rear cover 164 is coupled to the module housing 160.

When assembled, the DC charging module 104 includes the DC terminals 126, the DC power cables 128, and the heat exchanger 300, which are held together as a unit. The DC charging module 104 is configured to be coupled to the housing 110 of the charging inlet assembly 100 as a unit and uncoupled form the housing 110 as a unit.

Figure 7:
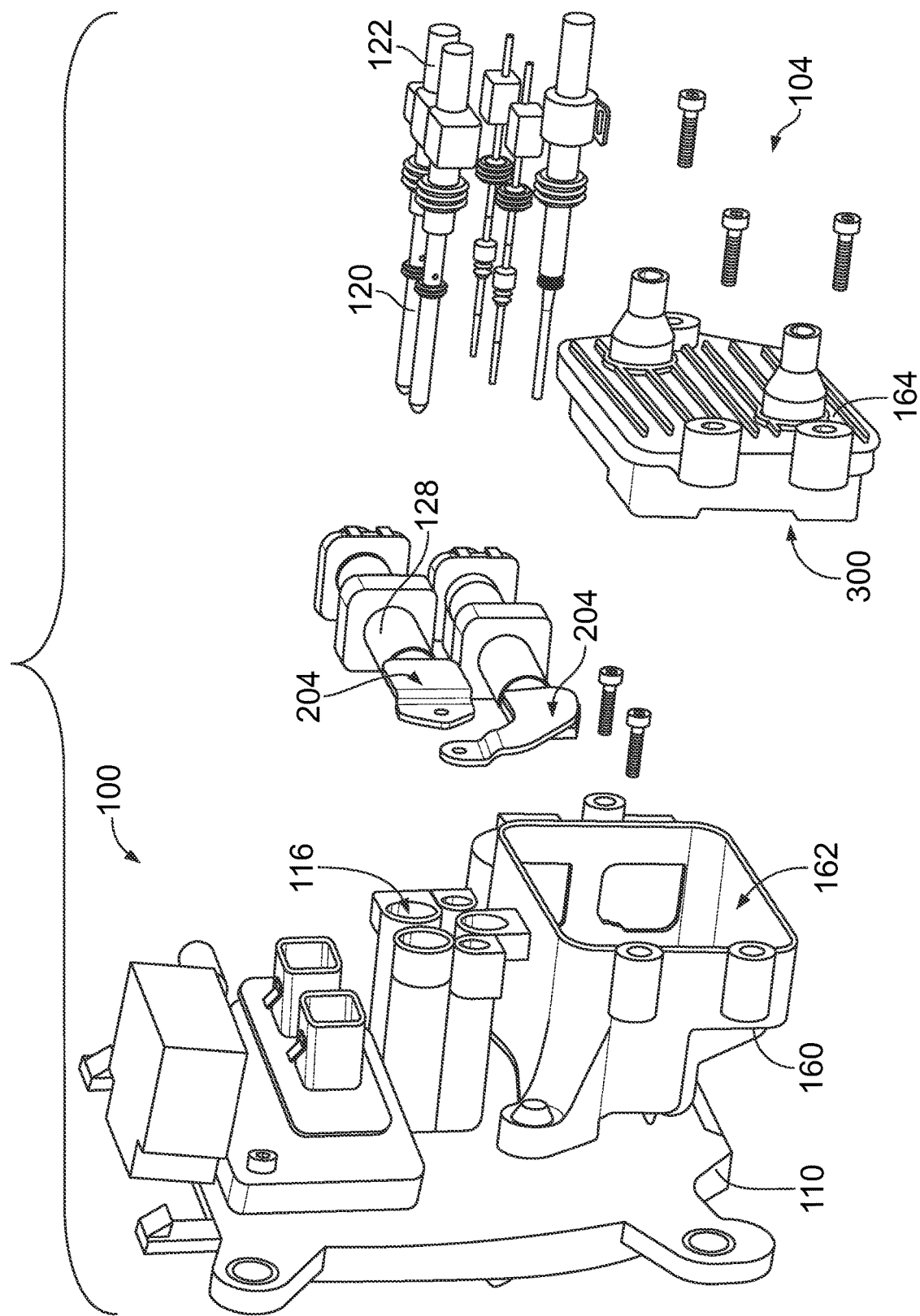
FIG. 7 is an exploded view of the charging inlet assembly in accordance with an exemplary embodiment.

FIG. 7 is an exploded view of the charging inlet assembly 100 in accordance with an exemplary embodiment. FIG. 7 shows the module housing 160 relative to the housing 110 of the charging inlet assembly 100. However, the module housing 160 may be coupled to the housing 110 after assembly of the components. FIG. 7 shows the AC terminals 120 and AC power cables 122 poised for loading into the AC terminal channels 116.

During assembly, the DC terminals 126 and the DC power cables 128 are loaded into the inner chamber 162. The DC terminals 126 are loaded into the DC terminal channels 118 when the DC charging module 104 is coupled to the housing 110. The DC power cables 128 are configured to be coupled to cable connectors 202 of the DC terminals 126 using the weld tabs 204. The heat exchanger 300 may be loaded into the rear cover 164 prior to coupling the rear cover 164 to the module housing 160.

Figure 8:
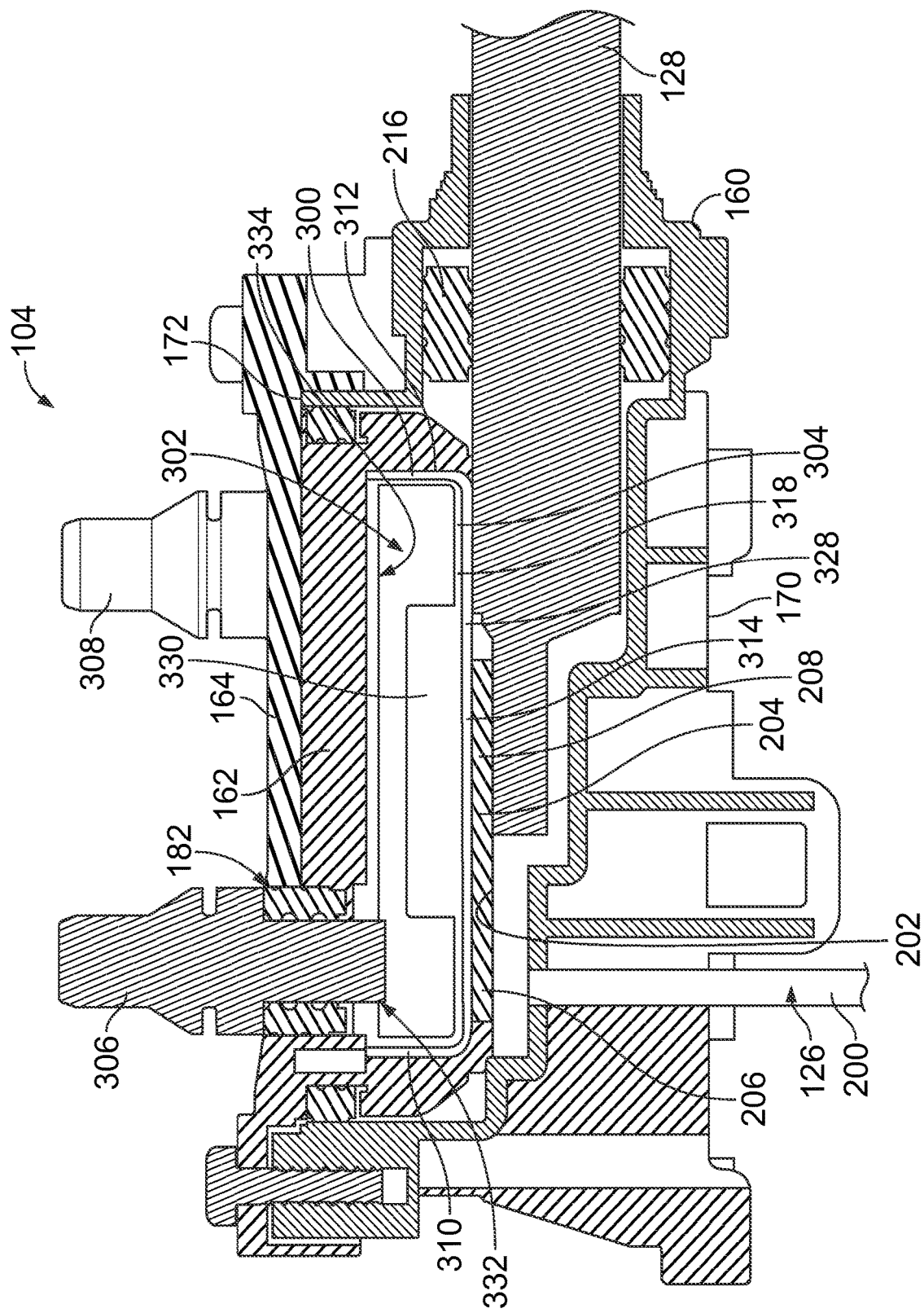
FIG. 8 is a cross sectional view of the DC charging module in accordance with an exemplary embodiment.

FIG. 8 is a cross sectional view of the DC charging module 104 in accordance with an exemplary embodiment. When assembled, the DC terminal 126 and the DC power cable 128 are located in the front portion of the inner chamber 162. The cable connector 202 of the DC terminal 126 is coupled to the weld pad 206 of the weld tab 204. The mating pin 200 of the DC terminal 126 extends through an opening in the front 170 of the module housing 160 and extends forward of the module housing 160 for receipt in the DC terminal channel 118 in the housing 110 of the charging inlet assembly 100. The DC power cable 128 is coupled to the weld pad 208 of the weld tab 204. The DC power cable 128 extends from the side of the module housing 160. The cable seal 216 is sealingly coupled to the module housing 160.

The heat exchanger 300 is located in the rear portion of the inner chamber 162. The rear cover 164 is coupled to the rear 172 of the module housing 160 to hold the heat exchanger 300 in the inner chamber 162. The end wall 318 at the front 314 of the heat exchanger 300 is coupled to the terminal/cable assembly, such as to the weld tab 204. The heat exchanger 300 is thermally coupled to the DC terminal 126, such as through the weld tab 204, to dissipate heat from the DC terminal 126 and reduce the operating temperature of the DC terminal 126. In an exemplary embodiment, the thermally conductive separator 328 electrically isolates the heat exchanger 300 from the DC terminal 126. The thermally conductive separator 328 is thermally conductive to provide efficient heat transfer between the heat exchanger body 304 and the weld tab 204. The fittings 306, 308 extends through the opening 182 of the rear cover 164. The fittings 306, 308 extends rearward of the module housing 160 for connection to a coolant line (not shown). The coolant channel 302 extends through the interior of the heat exchanger 300, such as between the fittings 306, 308. In an exemplary embodiment, the heat exchanger 300 includes a divider wall 330 extending into the coolant channel 302. The coolant is configured to flow along the divider wall 330 between a supply port 332 at the supply side 310 and a return port 334 at the return side 312. In the illustrated embodiment, the divider wall 330 extends from the end wall 318 and is thermally coupled to the end wall 318. The divider wall 330 includes sides in the coolant channel 302 that increase surface area for heat transfer.

The DC charging module 104 includes the DC terminals 126, the DC power cables 128, and the heat exchanger 300, which are held together as a unit. The DC charging module 104 is configured to be coupled to the housing 110 of the charging inlet assembly 100 as a unit and uncoupled form the housing 110 as a unit.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A DC charging module for a charging inlet assembly, the DC charging module comprising:
   a module housing extending between a front and a rear, the module housing having an inner chamber between the front and the rear, the module housing including a separable mating interface at the front configured to be removably coupled with a housing of the charging inlet assembly;
   a terminal including a mating pin at a front of the terminal and a cable connector at a rear of the terminal, the cable connector being located in the inner chamber of the module housing, the mating pin extending forward of the module housing into the charging inlet assembly for mating with a charging connector coupled to the charging inlet assembly;
   a power cable extending into the inner chamber of the module housing to electrically connect to the cable connector of the terminal; and
   a heat exchanger received in the inner chamber of the module housing and removable from the charging inlet assembly with the module housing, the heat exchanger being thermally coupled to the cable connector of the terminal, the heat exchanger including a coolant channel for coolant flow through the heat exchanger for actively cooling the terminal.

2. The DC charging module of claim 1, wherein the module housing includes a separable mating interface at the front of the module housing, the separable mating interface configured to be removably coupled to the charging inlet assembly.

3. The DC charging module of claim 1, wherein the heat exchanger includes a thermal interface thermally coupled to the cable connector to dissipate heat from the terminal.

4. The DC charging module of claim 1, wherein the heat exchanger includes a heat exchanger body and a thermally conductive separator between the heat exchanger body and the cable connector, the thermally conductive separator electrically isolating exchanger body from the cable connector.

5. The DC charging module of claim 1, wherein the heat exchanger includes a heat exchanger body defining the coolant channel, the heat exchanger including a supply port coupled to a coolant supply line and a return port coupled to a coolant return line.

6. The DC charging module of claim 1, wherein the heat exchanger includes a heat exchanger seal sealingly coupled to the module housing.

7. The DC charging module of claim 1, wherein the heat exchanger extends between a supply side and a return side, the coolant channel being in flow communication with the supply side and the return side.

8. The DC charging module of claim 1, wherein the heat exchanger includes a divider wall extending into the coolant channel, the coolant flowing along the divider wall between a supply port and a return port.

9. The DC charging module of claim 1, wherein heat exchanger is generally box shaped defined by a planar sides, the heat exchanger including a thermal interface thermally coupled to the cable connector at the side having the largest surface area.

10. The DC charging module of claim 1, wherein the power cable includes a weld pad, the weld pad being coupled to the cable connector, the heat exchanger being thermally coupled to the weld pad.

11. The DC charging module of claim 1, further comprising a second terminal including a second mating pin and a second cable connector terminated to a second power cable the heat exchanger being thermally coupled to the second cable connector of the second terminal.

12. The DC charging module of claim 1, further comprising fasteners coupled to the module housing, the fasteners configured to be removably coupled to the charging inlet assembly.

13. The DC charging module of claim 1, wherein the terminal is removable from the charging inlet assembly with the module housing.

14. The DC charging module of claim 1, wherein the power cable includes a cable seal, the cable seal being sealingly coupled to the module housing.

15. A charging inlet assembly for an electric vehicle comprising:
   a housing extending between a front and a rear, the housing having a DC section including DC terminal channels, the housing having an AC section including AC terminal channels, the DC section configured for mating with a DC charging connector at the front, the AC section configured for mating with an AC charging connector at the front;
   AC terminals received in the corresponding AC terminal channels for mating with the AC charging connector;
   DC terminals received in the corresponding DC terminal channels for mating with the DC charging connector, each DC terminal including a mating pin at a front of the DC terminal and a cable connector at a rear of the DC terminal, the cable connector being connected to an end of a power cable, the mating pin positioned in the corresponding DC terminal channel for mating with the charging connector; and a DC module coupled to the rear of the housing, the DC module including a module housing and a heat exchanger received in the module housing, the module housing extending between a front and a rear, the module housing including a separable mating interface at the front configured to be removably coupled with the housing of the charging inlet assembly, the module housing having an inner chamber, the inner chamber receiving the cable connector of each DC terminal and the end of the corresponding power cable, the inner chamber receiving the heat exchanger, the heat exchanger being thermally coupled to the cable connector of each DC terminal, the heat exchanger including a coolant channel for coolant flow through the heat exchanger for actively cooling the DC terminals, the heat exchanger being removable from the housing with the module housing.

16. The charging inlet assembly of claim 15, wherein DC terminals are removable from the charging inlet assembly with the module housing.

17. The charging inlet assembly of claim 15, wherein the heat exchanger includes a heat exchanger body and a thermally conductive separator between the heat exchanger body and the cable connectors of the DC terminals, the thermally conductive separator electrically isolating exchanger body from the cable connectors.

18. The charging inlet assembly of claim 15, wherein the heat exchanger includes a heat exchanger body defining the coolant channel, the heat exchanger including a supply port coupled to a coolant supply line and a return port coupled to a coolant return line.

19. The charging inlet assembly of claim 15, wherein each power cable includes a weld pad, the weld pad being coupled to the cable connector of the corresponding DC terminal, the heat exchanger being thermally coupled to the weld pad.

20. A charging inlet assembly for an electric vehicle comprising:

a housing extending between a front and a rear, the housing having a DC section including DC terminal channels, the housing having an AC section including AC terminal channels, the DC section configured for mating with a DC charging connector at the front, the AC section configured for mating with an AC charging connector at the front;

AC terminals received in the corresponding AC terminal channels for mating with the AC charging connector;

a first DC terminal including a first mating pin at a front of the first DC terminal and a first cable connector at a rear of the first DC terminal, the first cable connector being connected to an end of a first power cable, the first mating pin positioned in the corresponding DC terminal channel for mating with the charging connector;

a second DC terminal including a second mating pin at a front of the second DC terminal and a second cable connector at a rear of the second DC terminal, the second cable connector being connected to an end of a second power cable, the second mating pin positioned in the corresponding DC terminal channel for mating with the charging connector; and a DC module coupled to the rear of the housing, the DC module including a module housing and a heat exchanger received in the module housing, the module housing extending between a front and a rear, the module housing including a separable mating interface at the front configured to be removably coupled with a housing of the charging inlet assembly, the module housing having an inner chamber, the inner chamber receiving the first and second cable connectors and the ends of the first and second power cable, the inner chamber receiving the heat exchanger, the heat exchanger including a first thermal interface thermally coupled to the first cable connector and a second thermal interface thermally coupled to the second cable connector, the heat exchanger including a coolant channel for coolant flow through the heat exchanger for actively cooling the DC terminals, the heat exchanger including a first thermally conductive separator at the first thermal interface electrically isolating the heat exchanger from the first cable connector, the heat exchanger including a second thermally conductive separator at the second thermal interface electrically isolating the heat exchanger from the second cable connector, the heat exchanger being removable from the housing with the module housing.

* * * * *